July 18, 1967
B. E. WRENSCH
3,331,481
MAGNETICALLY RELEASABLE SPRING-ENGAGED
FRICTION AND JAW CLUTCH
Filed Aug. 23, 1965
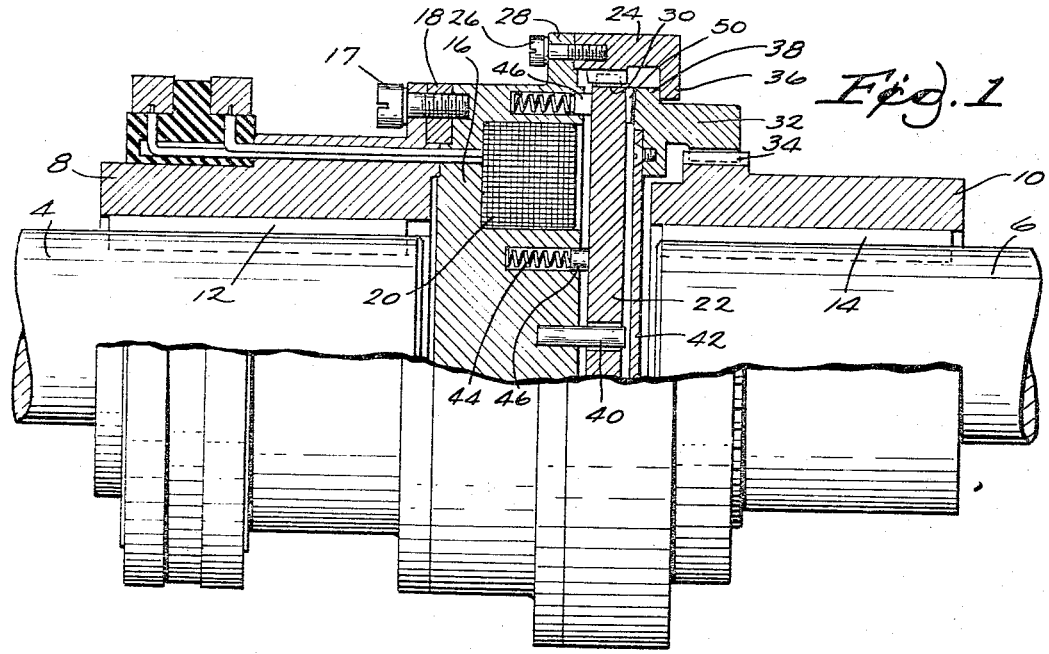
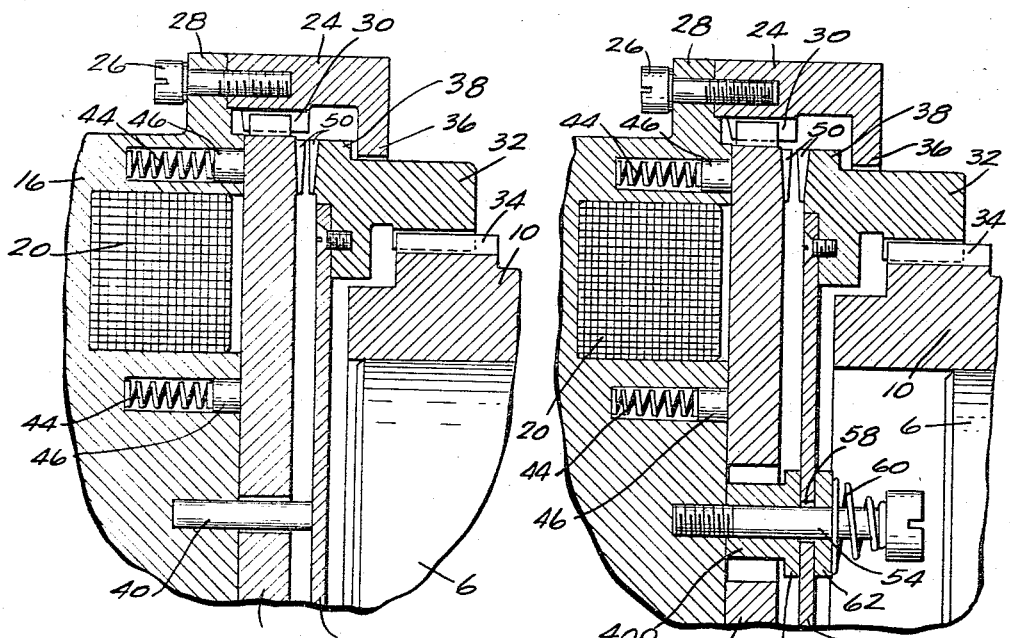
INVENTOR
BERNARD E. WRENSCH
BY Wheeler, Wheeler + Wheeler
ATTORNEYS 3,331,481
MAGNETICALLY RELEASABLE SPRING-ENGAGED FRICTION AND JAW CLUTCH
Bernard E. Wrensch, Brookfield, Wis., assignor to Stearns Electric Corporation, Milwaukee, Wis., a corporation of Wisconsin
Filed Aug. 23, 1965, Ser. No. 481,787
6 Claims. (Cl. 192—90)

This invention relates to a magnetically releasable spring-engaged clutch. The present device is an improvement upon that shown in my Patent 3,172,515, granted Mar. 9, 1965.

As in the device of the patent, the clutch is fundamentally a disk clutch in which one disk is clamped between opposed clutch surfaces except when the biasing pressure is relieved electromagnetically. However, complementary driving and driven clutch elements preferably have radial teeth to minimize the spring pressure required to maintain a driving connection. The thrust of the spring pressure is balanced within the clutch itself to relieve the driving and driven shafts and shaft bearing from transmission of this thrust.

The driving teeth are preferably mounted on an axially movable clutch element which also is an armature disk, while the teeth of the driven clutch element are formed on a floating ring which is splined to the driven clutch element and engaged by a clutch cage that contributes drive torque frictionally when the clutch is engaged. The cage also serves to restrain movement of the driven ring axially away from the armature.

Movement of this ring toward the armature is limited by centrally disposed stop means of fixed length directly interposed between the magnet body and a disk which is carried by the floating ring. Because the stop means is remote from the periphery of the floating ring, I have eliminated a somewhat difficult adjustment required in the device illustrated in Patent 3,172,515. Also made possible by the improved construction is a more sturdy splined connection between the floating driven ring and the driven hub.

The invention contemplates that the driven clutch element shall include a disk or plate extending across the driven shaft and its hub so that the stop member can be located axially at the center of the magnet body.

A disclosed modified embodiment further contemplates that a light spring be used to bias the driven clutch element toward said stop when the magnet is energized, thus assuring the release of the driven clutch element from a frictional driving flange on the cage which is a part of the driving structure.

In the drawings:

FIG. 1 is a view in axial section of a clutch embodying the invention with the parts in the position which they assume when the clutch is engaged.

FIG. 2 is a fragmentary view similar to FIG. 1 except that it shows the clutch elements disengaged.

FIG. 3 is a view similar to FIG. 2 showing a modified embodiment of the invention.

The shafts 4 and 6 are axially aligned. Either may be the driving shaft. For the purposes hereof, and without limitation, it may be assumed that shaft 4 is the driving shaft and shaft 6 the driven shaft.

Detachably mounted on the shaft 4 is a hub 8. Detachably mounted on shaft 6 is the driven hub 10. The hubs are connected to respective shafts by the keys 12 and 14.

The magnet body 16 is connected with hub 8 in any appropriate manner, as by means of cap screws 17 and radial keys 18. Within an appropriate channel in the magnet body, is the usual energizing coil 20 which may be supplied with current as shown in Patent 3,172,515. The magnet body 16 may extend across the end of the driving shaft as shown.

Extending across the axis of the drive shaft 4 and hub 8 is the armature disk 22, the periphery of which is splined to a clutch cage 24.

The clutch cage 24 is held, as by cap screws 26, to the flange 28 of magnet body 16. The armature disk 22 is also a clutch element constrained by the splined connection 30 to rotate with shaft 4.

The driven clutch element 32 is an annulus which has a splined connection at 34 with the hub 10 on the driven shaft 6. The splined connection at 34 permits the driven clutch element to float axially of hub 10 between a relatively retracted position in which the clutch is engaged, and a relatively advanced position in which the clutch is disengaged. The flange 36 on the clutch cage 24 engages a radial flange 38 on the driven clutch element 32 to define the retracted position to which clutch element 32 is urged when engaged by the spring biased driving clutch element or armature 22.

The advanced position of the driven clutch element is defined by the stop pin 40. This pin is not necessarily non-magnetic although I prefer to use a substantially non-magnetic stainless steel for this pin. The peripheral locations of the stops in Patent 3,172,515 were found to leave the floating clutch element unbalanced. The problem of unbalance was solved by using stop means of fixed length remote from the periphery. In practice, it is preferred to use a single stop pin which is socketed axially in the magnet body and projects through the driving clutch element 22 into engagement with a disk 42 fixed to the annular driven clutch element 32 in a position where it extends across the end of the hub 10 and the driven shaft 6, in spaced relation thereto. It will be observed that flange 36 in one direction and the pin 40 in the opposite direction limit the range of movement of the driven clutch element 32 in an axial direction. Thus, the range of axial movement permitted to the floating driven clutch element is defined entirely by these parts fixedly connected with the shaft 4 which, in the instant device, is assumed to be the driving shaft.

The clutch is normally engaged. It is disengaged magnetically by the energization of coil 20. When the coil 20 is de-energized, the springs 44, seated in pockets in the magnet body 16, act through the floating spring seats 46 to bias the driving clutch element 22 toward the driven clutch element 32, thus forcing the latter to its extreme retracted position as defined by engagement of flanges 36 and 38 as above described. In addition to the driving torque transmitted by the teeth 50 from the driving clutch element 22 to the driven clutch element 32, it will be noted that substantial torque is also transmitted frictionally from flange 36 to flange 38, these flanges being, in effect, clutch disks subject to the bias of springs 44.

In order to reduce the amount of spring bias required for the desired transmission of torque from shaft 4 to shaft 6, teeth 50 are provided in annular series on complementary face portions near the peripheries of the driving and driven clutch elements as described in Patent 3,172,515. The teeth are shallow and do not prevent the clutch from slipping when its torque transmitting capacity is exceeded. Yet, since the portions of the clutch elements 22 and 32 which are engaged for clutch purposes are toothed, it will be apparent that the torque transmitting capacity must be much higher for a given spring bias in a clutch engaging direction than would otherwise be possible.

When the coil 20 is energized, as shown in FIG. 2, the driving clutch element 22, which serves as an armature for the magnet body 16, will be advanced away from the driven clutch element 32. Since the driven clutch element 32 is free for limited axial movement respecting hub 10, there will no longer be any substantial driving friction between flanges 36 and 38. However, the engagement of the disk 42 with the fixed stop pin 40 will assure the disengagement of the teeth 50.

FIG. 1 shows the parts as they appear when the coil 20 is de-energized. The driving clutch element of armature 22 is biased by springs 44 toward hub 10. It engages the floating driven clutch element 32 to urge the latter toward the retracted position in which the floating element 32 engages the flange 36 of clutch 24. The frictional drive between flanges 36 and 38 is supplemented by a more positive drive through the teeth 50 with which clutch elements 22 and 32 are provided.

The alternative embodiment shown in FIG. 3 is similar in most respects to that already described. However, the stop pin 400 which replaces stop pin 40 has the form of a headed sleeve mounted on the shank of cap screw 54. In this instance, the head 56 of the stop member 400 engages the disk 420 to limit the advancing movement of the floating clutch element 32. However, the cap screw projects through an opening 58 in the disk 420. The light spring 60 encircling the cap screw and seated against the head thereof is engaged with a spring seat collar 62 on the cap screw which engages disk 420 around the opening 58. This spring 60 provides bias which assures separation of flange 38 of the floating clutch element 32 from flange 36 of the clutch cage 24 (when the magnet is energized). FIG. 3 shows the condition of the parts when the magnet is energized and the clutch is disengaged. It will be observed that the teeth 50 of the clutch elements 22 and 32 are separated and the flanges 38 and 36 are also separated.

As in the construction first described, no adjustment is required. The axial cap screw 54 is permanently fixed in the magnet body 16. The spring 60 is so light as to be readily overcome by the bias of springs 44 when the magnet is de-energized. When this occurs, the clutch is re-engaged by springs 44 which bring the teeth of elements 22 and 32 into mesh and frictionally engage flanges 38 and 36.

I claim:

1. In a clutch engaged by spring bias and disengaged electromagnetically, the combination with a magnet body having means for attaching it to a shaft, of a first clutch element constituting an armature having splined connection with said body, means for energizing said body to attract the armature, spring means for urging the armature from said body, a second clutch element comprising a disk extending across the armature, means providing a splined connection upon which the second clutch element is movable axially toward and away from the magnet body, and fixed stop means comprising a post connected with the magnet body and projecting from said body through an opening with which the first clutch element is provided, the second clutch element having means engageable with said stop means to limit its advance toward the magnet body, whereby to assure disengagement of said elements when the magnet body is energized.

2. A clutch normally connecting aligned shafts and comprising first and second hubs for mounting on said shafts, a magnet body having an energizing coil and connected with the first hub, an annular clutch cage connected with the magnet body and projecting axially therefrom and provided with a clutch flange, a first clutch element constituting an armature extending across said body and peripherally in splined connection with said cage, spring means between the body and said first clutch element and acting on said element in a direction to move it away from the magnet body, a second clutch element interposed between the first clutch element and the clutch flange of the clutch cage, means providing a splined connection between the second clutch element and the second hub and upon which connection the second clutch element is movable axially of the second clutch hub, the second clutch element being clamped between the first clutch element and the clutch flange of said cage when the magnet body is de-energized, and fixed stop means mounted on the magnet body remote from the periphery of the second clutch element and about which a central portion of the second clutch element is in balance for limiting the movement of the second clutch element toward the magnet body when the latter is energized, thereby to assure complete disconnection of the first clutch element from the second clutch element.

3. A clutch according to claim 2 in which the first and second clutch elements have radially toothed clutch surfaces adjacent their respective peripheries and in positions to be engaged under the bias of the springs acting on the first clutch element when said magnet body is de-energized.

4. A clutch according to claim 2 in which the second clutch element comprising an annulus having a disk portion extending across the second hub and in a position for balanced engagement with the fixed stop means with which the magnet body is provided.

5. A clutch according to claim 4 in which said stop is a non-magnetic pin disposed axially and the disk is substantially continuous across the stop.

6. A clutch according to claim 4 in which the disk is apertured and the stop is a sleeve supported by means extending through the aperture of the disk, said last means including a spring seat, and a light spring engaged with said seat is interposed between the seat and the disk and biases the disk toward the magnet body to the limit of advance defined by said stop, said spring being overcome by the spring bias to which the first clutch element is subject, said light spring tending to disengage the second clutch element from the clutch flange of said cage when the magnet is energized and to permit reengagement of the second clutch element with said flange when the magnet is de-energized.

References Cited

UNITED STATES PATENTS

| | | | |
|---|---|---|---|
| 1,629,304 | 5/1927 | Price | 192—84 |
| 2,983,339 | 5/1961 | Neff. | |
| 3,172,515 | 3/1965 | Wrensch | 192—90 |

MARK NEWMAN, *Primary Examiner.*

ARTHUR T. McKEON, *Examiner.*